April 16, 1963 W. C. O'NEILL 3,085,395
AFTERBURNER FUEL CONTROL
Filed Oct. 26, 1960 3 Sheets-Sheet 2

INVENTOR.
WILLIAM C. O'NEILL
BY
Carl Baker
ATTORNEY

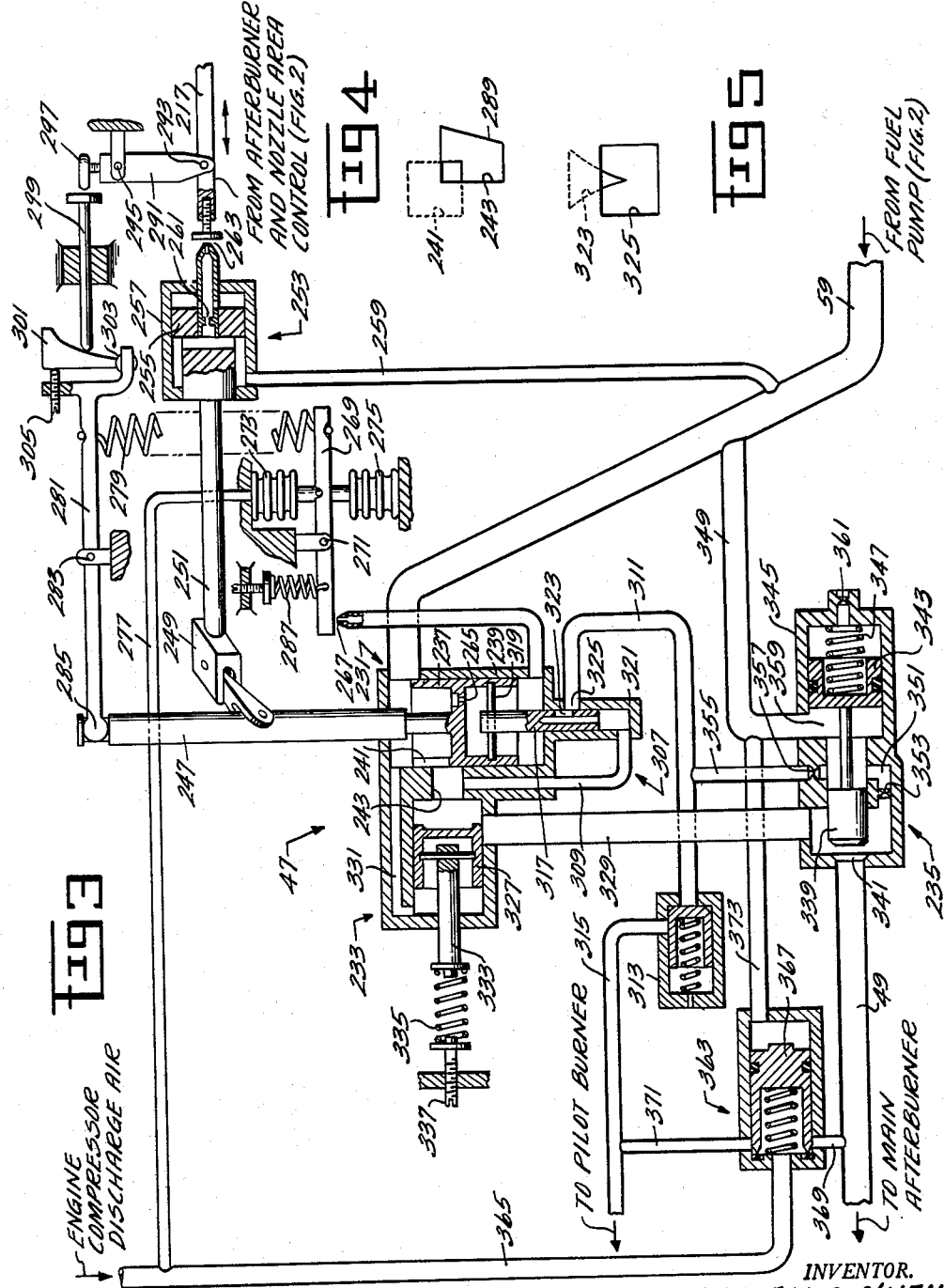

United States Patent Office 3,085,395
Patented Apr. 16, 1963

3,085,395
AFTERBURNER FUEL CONTROL
William Charles O'Neill, Washington, D.C., assignor to General Electric Company, a corporation of New York
Filed Oct. 26, 1960, Ser. No. 65,095
5 Claims. (Cl. 60—35.6)

This invention relates generally to fuel control systems for combustion turbine engines and more specifically to engine afterburner fuel controls.

It is common practice particularly in the case of high performance aircraft turbojet engines to provide engine thrust augmentation by burning additional fuel in the engine tailcone downstream of the turbine and ahead of the engine exhaust nozzle, to increase the temperature and pressure levels in the tailcone with resultant increase in velocity of the propulsive jet stream discharged through the engine nozzle. Usually such afterburning operation is utilized only during periods when maximum power output is required of the engine, as for example during take-off of the aircraft and during military combat maneuvers.

Generally it is desired to control afterburner operation by the main engine throttle lever, in a manner such that the throttle lever holds the afterburner out of operation until the full available power output of the engine without afterburning is realized. Once this point is reached, any further advancement of the throttle lever will bring the afterburner into operation and increase the level of power augmentation afforded thereby in direct relation to throttle lever position. Afterburner fuel supply normally can not be metered simply as a function of throttle lever position, however, without problems of inadequate or excessive fuel-air ratio at the afterburner.

These problems stem primarily from the fact that afterburner fuel combustion can satisfactorily be maintained only if the fuel-air ratio at the afterburner is at least sufficiently high to support combustion, but if permitted to become too high may cause undesirably high engine temperature levels and waste of fuel due to incomplete combustion. It therefore is desirable to introduce a measure of afterburner air flow rate into the fuel metering system and to control fuel flow in accordance therewith, to maintain the afterburner fuel-air ratio between predetermined minimum and maximum limits.

This minimum limit is desirably made as low as possible consistent with reliable combustion, and may be made substantially lower if instead of attempting to maintain combustion over the entire cross-sectional area of the afterburner, fuel supply and combustion is limited to but one element of the burner such as by use of a pilot burner. With this arrangement burnable fuel-air ratios may be maintained adjacent the pilot burner even at fuel flow rates too low to support combustion at the main burners.

Desirably, therefore, the afterburner fuel metering system should include means for metering total afterburner fuel flow as a combined function of throttle lever position and afterburner air flow, and should apportion the fuel between the main and pilot burners in a manner to maintain burnable fuel-air ratios especially at the pilot burner. The system should also impose minimum limits on afterburner fuel supply to both main and pilot burners irrespective of throttle lever position, since unless a burnable fuel-air ratio is maintained the fuel supplied can not be utilized.

It is accordingly a primary object of the invention to provide afterburner fuel metering systems satisfying these and other desiderata of such systems. It is also an object of the invention to provide an afterburner fuel metering system comprising main burner and pilot burner metering valves operatively interconnected to provide conjoint control of main and pilot burner fuel supply with optimized control yet simple mechanism.

Another object of the invention is the provision of an afterburner fuel metering system affording normal control responsive to inputs representing throttle lever position and afterburner air flow, with means responsive to the latter input operable to impose a minimum fuel limit independent of the former. Still another object is the provision of afterburner fuel metering means characterized by simplicity of structure and consequent reliability of operation and economy of manufacture.

The invention in one preferred embodiment comprises an afterburner fuel metering system for use with a throttle lever controlled turbine engine including an afterburner. Preferably the afterburner is of the type including a main burner or burners and a pilot burner, and the fuel metering system of the invention then includes a first metering valve for controlling total fuel flow and a second metering valve for controlling pilot burner fuel flow. These valves both include vlave piston and cylinder members free for relative movement in both rotary and translatory modes and have cooperating ports therein defining fuel metering orifices. The total flow metering valve members in one of their two modes of relative movement are controlled by means responsive to throttle lever position. Means providing a measure of afterburner air flow control movement of the valve members in the second mode of relative movement, and the total flow and pilot burner metering valves are interconnected to assure conjoint movement thereof in at least this second mode so that both total flow and pilot burner fuel metering is dependent on air flow. For maintaining proportionality between total fuel flow and the open area of the total flow metering valve, and also to divide the total flow between the main and pilot burners, a pressure regulating valve operative in response to the pressure drop across the total flow metering valve is interposed in the flow line to the main burner and operates to limit the pressure drop to a predetermined fixed maximum by control of main burner fuel flow. The invention also comprehends means for imposing a limit on movement of the total flow metering valve in valve closing direction in response to its throttle lever control input. The limit is imposed by means operative under control of the afterburner air flow responsive means, so as to be variable as a function of afterburner air flow.

These and other objects, features and advantages of the invention will become apparent and the invention further understood by reference to the appended claims and the following detailed description when read in conjunction with the accompanying drawings, wherein:

FIGURE 3 is a schematic diagram of the afterburner fuel metering unit of FIGURE 1.

Figure 1:
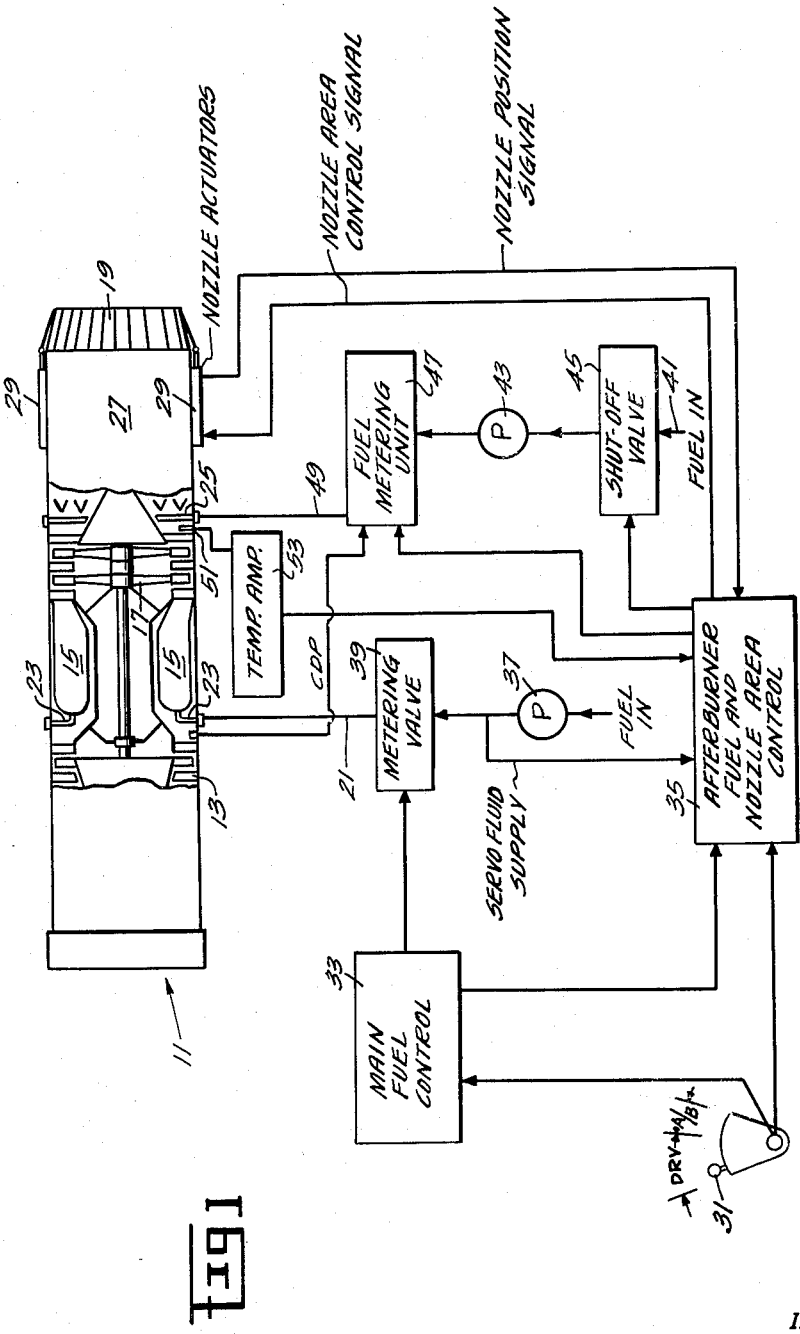
FIGURE 1 illustrates schematically a turbojet engine including an afterburner and variable area nozzle, and control means therefor.

With continued reference to the drawings, wherein like reference numerals have been used throughout to designate like elements, an aircraft turbojet engine including an afterburner and variable area nozzle is designated generally by reference numeral 11 in FIGURE 1. As there shown, the engine comprises a compressor 13 providing high pressure combustion air to a plurality of combustion chambers 15 the combustion gases from which discharge through a turbine 17 to drive the compressor, and then exhaust through the engine nozzle 19 to provide propulsive thrust. Fuel supply to the engine main combustion chambers 15 is through a line 21 connected to supply fuel to nozzle elements 23 each of which is arranged to eject fuel into the combustion chamber 15 in which mounted.

The engine 11 is equipped with an afterburner fuel manifold as shown at 25 arranged to eject a spray of fuel into the engine tailpipe 27 downstream of turbine 17, with this supplementary fuel providing thrust augmentation during periods when maximum thrust output is reqired, as for example during take-off. With an engine thus equipped for afterburning operation, controlled variation of the engine nozzle exit area is desirable in order to obtain efficient operation under the widely varying conditions which exist during afterburning and non-afterburning or "dry" operation. To this end, the exhaust nozzle 19 of the engine is provided with means such as the flap elements shown for varying the effective exit area of the nozzle. Such nozzle area varying means are well known in the art and require no discussion except to note that movement of the nozzle area varying elements is by operation of one or more actuators 29 connected to drive the nozzle in opening and closing directions in accordance with a control input signal.

Preferably though not necessarily a single throttle lever is provided to control operation of the entire engine, including control of its main fuel supply as well as of afterburner fuel supply and nozzle area. Such single lever control is illustrated in FIGURE 1 wherein the throttle lever 31 is shown linked to the engine main fuel control 33 for metering fuel to the engine main burners, and is shown linked to the afterburner fuel and nozzle area control unit 35 for controlling both the supply of afterburner fuel and operation of the nozzle actuators 29.

The engine main fuel supply and control system may be conventional except for inclusion of means providing an acceleration signal to the afterburner fuel and nozzle area control as hereinafter explained. The main fuel system includes a pump 37 which has its inlet connected to the aircraft fuel tanks and discharges through a metering valve 39 operative to control the rate of fuel flow to the engine main burners 15. This metering valve is under control of the main fuel control system 33, and this in turn is controlled by throttle lever 31 as previously mentioned. Typically the main fuel control system includes engine speed responsive means operative to hold engine speed constant at a speed setting scheduled by the throttle lever, though the afterburner fuel and nozzle area control of the present invention is not in any way limited to use with fuel controls operative in this particular manner.

The afterburner fuel supply system includes a supply line 41 connecting to the inlet of a pump 43 through a shut-off valve 45, with the pump connected to discharge through a metering valve assembly 47 into a line 49 connecting to the engine afterburner fuel manifold 25. Both the shut-off valve 45 and the metering valve 47 operate under control of the afterburner fuel and nozzle area control unit 35 in response to the various inputs to that unit. Among these are the throttle lever input previously menioned, and a turbine temperature signal provided by a thermocouple or thermocouples 51 mounted in the engine tailcone just downstream of the turbine 17 so as to produce a turbine temperature signal which is amplified by temperature amplifier 53 before transmission to the afterburner fuel and nozzle area control unit, and a nozzle position signal which is supplied to the afterburner fuel and nozzle area control unit from the nozzle actuators and indicates present position of the nozzle.

Figure 2:
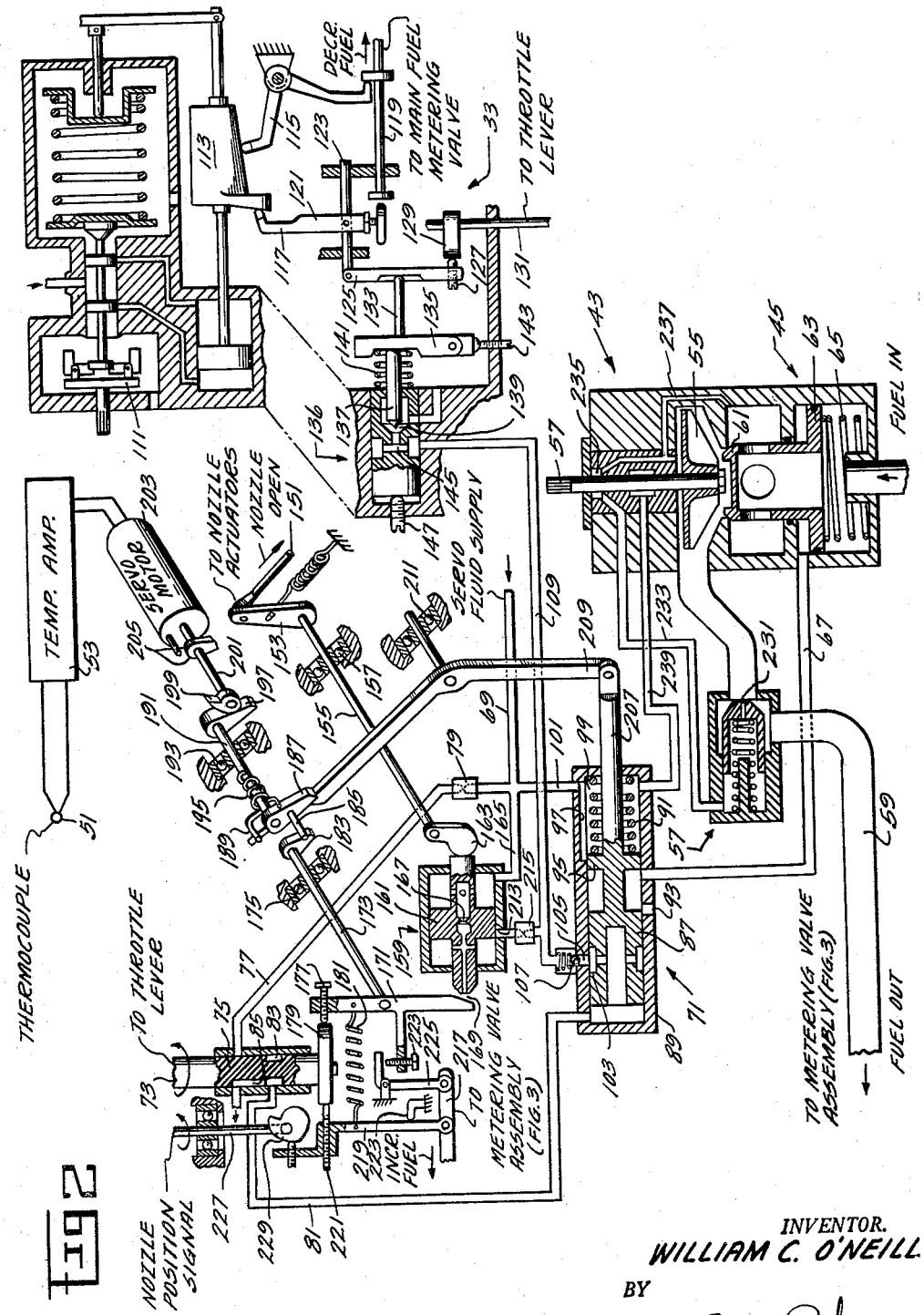
FIGURE 2 is a schematic diagram of the afterburner fuel and nozzle area control of FIGURE 1.

With reference now to FIGURE 2, the afterburner fuel and nozzle area control unit 35 of FIGURE 1 is shown schematically, together with the afterburner fuel pump 43, the shut-off valve 45, and that portion of the main fuel control 33 which provides the necessary acceleration signal to the afterburner fuel and nozzle area control. The afterburner fuel pump 43 shown is of centrifugal type and includes an impeller 55 mounted to a shaft 57 which preferably but not necessarily is engine driven. The pump impeller 55 draws fuel in through the shut-off valve 45, and discharges through a check and drain valve assembly designated generally by reference numeral 57.

The fuel then is ducted through a line 59 to the fuel metering unit 47 (FIGURE 1) and to the engine afterburner fuel manifold.

The shut-off valve 45 comprises a valve head 61 adapted to seat against the forward wall of the pump impeller chamber to thus seal off the pumping chamber from the inlet line. Valve head 61 is positioned by an actuator piston 63 which is loaded in valve closing direction by a compression spring 65 and may be driven in valve opening direction by fluid pressure in the space above the piston and within the cylinder in which it translates. The supply of pressure fluid to this space is through a line 67 which connects to the servo fluid supply line 69 through a lock-out valve assembly designated generally by reference numeral 71.

From FIGURE 1 it will be noted that the servo fluid supply for operating the shut-off valve actuator and energizing other elements of the afterburner fuel and nozzle area control is obtained by connection into the engine main fuel system just downstream of the engine main fuel pump 37. This is of advantage in that it avoids the necessity for a separate operating fluid supply and also in that it assures the availability of servo operating fluid whenever the engine is operating since the main fuel pump normally is directly geared to the engine.

The operation of lock-out valve assembly 71 is under control of the throttle lever 31 (FIGURE 1), with the throttle lever input to the control unit of FIGURE 2 being by rotation of a throttle shaft 73 shown at upper left in FIGURE 2. This shaft 73 has affixed thereto a pilot valve element 75 which controls fluid communication between an inlet line 77 connected to the servo fluid supply line 69 through a fixed orifice 79, and an outlet line 81 connecting into the lock-out valve assembly 71 to control operation thereof.

The spool element of pilot valve 75 has cut therein a circular groove 83 in open communication with the line 81, and a longitudinal slot 85 which opens into the groove 83 at one end and is adapted to overlie the port to line 77 at its other end. This slot 85 is so located and is of such width that it places the inlet and outlet lines 77 and 81 in fluid communication with each other whenever the throttle shaft 73 occupies an angular position corresponding to a throttle lever setting anywhere in the afterburner operating range, as indicated by the letters A/B in FIGURE 1.

Thus, whenever afterburner operation is called for by the throttle lever, a fluid pressure signal is transmitted from the servo supply line 69 through pilot valve 75 and line 81 to the lock-out valve assembly. As shown, this assembly comprises a valve piston 87 slidable within a cylinder 89 in response to unbalance between a leftward directed force provided by a loading spring 91 compressed between the piston and the cylinder end wall, and a rightward directed force provided by the fluid pressure signal communicated through line 81. This fluid pressure derived force substantially exceeds that of the applied force of spring 91, so that whenever pressure fluid is supplied through line 81 the valve piston 87 will move to the right.

As the valve piston moves, it first acts to block a port 93 through which the shut-off valve actuating line 67 connects to drain. As rightward movement continues, a land 95 on the valve piston uncovers a port 97 and, through this port, the shut-off valve actuating line 67 now connects to a chamber 99 formed within cylinder 89. This chamber 99 is maintained at servo fluid supply pressure through a line 101 connecting directly to the servo fluid supply line 69.

Thus, when the lock-out valve piston 71 completes its movement toward the right, responsive to a throttle lever input calling for afterburner operation, servo fluid at supply pressure may flow through lines 69 and 101, valve port 97 and line 67 to the cylinder space above the shut-off valve piston 63. The force loading thus imposed upon the piston will overcome the opposed force of spring 65 and cause the shut-off valve to move to full open position, permitting free flow of fuel to the afterburner fuel pump 43. In this fashion, operation of the shut-off valve and fuel pump is directly controlled by the throttle lever input in a manner such as to initiate after-burner fuel flow whenever called for by throttle lever setting.

This operation is subject to an override, however, which will now be explained. The valve piston 87 of lock-out assembly 71 has formed therein an annular groove 103 open through radial passages in the piston to the end of cylinder 89 to which the inlet line 81 connects. Groove 103 cooperates with a valve port 105 which is formed in the cylinder wall and opens through a check valve 107 to a line 109. This line connects into the main fuel control 33 a portion of which is shown at upper right in FIGURE 2. Preferably, but not necessarily, this main fuel control may be of the general construction shown in the co-pending application of William F. Marscher, Serial No. 65,104, filed on an even date herewith and assigned to the assignee of the present application.

As more fully explained in the Marscher application, the main fuel control comprises an engine speed sensor 111 operative to position a cam member 113 as a direct function of engine speed. Such positioning of cam 113 is accomplished through servo mechanism the details of which are not essential to understanding of the present invention; suffice it to say here that the servo acts to translate the cam 113 towards the left with increasing engine speed and towards the right with decreasing engine speed so that cam position accurately represents engine speed.

Cam 113 includes two camming surfaces one of which is engaged by a cam follower 115 to provide acceleration fuel flow limiting, the other is engaged by a follower 117 to provide steady-state speed control, with both these followers operating to perform their respective functions by control of translatory movement of a push rod 119 which connects to the engine main fuel metering valve (shown at 39 in FIGURE 1). Cam follower 117 is carried by a speed lever 121 which is pivotally connected to a rod member 123 in turn pivotally connected to one end of a speed reset lever 125. The other end of this lever 125 carries a cam follower 127 operatively engaging a speed reset cam 129 affixed to a throttle shaft 131 which may be directly linked to the throttle lever 31 (FIGURE 1).

Intermediate its ends the speed reset lever 125 bears against a pivot 133 affixed to a member 135 having also affixed thereto the stem element 137 of an acceleration signal valve assembly designated generally by reference numeral 136. This assembly comprises a valve seat 139 formed in a sleeve element slidable within a bore in the main fuel control housing and positioned therein by a threaded adjustment member 147 as shown. The pivot element 135 is urged in a direction to open the acceleration valve by a spring 141 compressed between it and the valve sleeve. Preferably the pivot element 135 is mounted as by means 143 permitting vertical adjustment of the pivot element for resetting engine maximum speed in the manner explained in the aforementioned Marscher application, the adjustment member 147 permitting reset of engine "idle" speed in a manner also analogous to that explained in the Marscher application.

The acceleration valve assembly 136 produces a control signal indicative of engine acceleration or other under-speed condition, by control of communication between the line 109 and drain. Such communication is afforded through the valve and ports 145 formed in the sleeve element thereof, whenever the valve stem 137 moves away from its seat 139. Before discussing the conditions under which such control signal is generated and the results thereof, operation of the parts of the engine main fuel control shown will first be summarized.

The push rod 119 which controls the engine main fuel metering valve is spring loaded by means (not shown) urging it in leftward direction into engagement with either or both the cam follower 115 and the speed lever 121 which carries cam follower 117, with the effect of such leftward movement being an increase of fuel flow to the engine main burners. Accordingly, push rod 119 will move leftwardly to increase fuel flow to the engine main burners until it reaches a position such as to engage one or the other of the cam follower members. The point at which engagement is made with cam follower 115 will depend solely upon engine speed as manifested by cam position; the point at which engagement is made with the speed lever 121 will depend both upon position of the cam and upon position of the speed reset rod lever 125, since movement of the latter is operative to shift the pivot point of the speed lever.

Disregarding for the moment the effect of movement of pivot element 133, it is apparent that rotation of throttle shaft 131 and of the speed reset cam 129 affixed thereto will rotate the speed reset lever 125 in a manner to shift the pivot point of speed lever 121. If the throttle shaft movement is in a direction to call for increased engine speed, the contour of reset cam 129 is such as to cause counterclockwise rotation of speed reset lever 125 thus causing translation of the pivot point of lever 121 towards the left. The speed lever 121 therefore will tend to pull away either from pushrod 119 or cam 113, or both, and assume a position as illustrated.

As engine speed increases, cam 113 translates towards the left and eventually will reach cam follower 117. Further translatory movement of the cam will rotate speed lever 121 in counterclockwise direction into engagement with pushrod 119, and as the engine reaches the speed called for this movement of speed lever 121 will shift the pushrod 119 towards the right in fuel flow decreasing direction. To do this, the speed lever 121 must exert a substantial force against the pushrod 119 since it is spring loaded towards the left, and the resultant reaction force accordingly is sufficient to act through rod 123, speed reset lever 125, pivot element 135 and valve stem 137 to close the valve orifice at 139. In this fashion, the end of the engine under-speed or acceleration condition, i.e., the attainment of the engine speed called for by the change in throttle lever setting, is signaled by closing of the acceleration valve 136.

Whenever the engine is operating substantially below the speed called for by the throttle lever setting, this condition will result in engagement of the acceleration limit cam follower 115 with cam 113, the cam being contoured to assure this. The speed lever 121 then separates either from push rod 119 or from cam 113, with consequent unloading of the valve 136 and opening movement thereof due to the action of spring 141. Such off-speed condition may exist either by reason of a change in throttle lever setting calling for increase in engine speed as just explained, or by reason of change in engine speed due to some other cause such as initiation of afterburner combustion with consequent increase of back pressure on the turbine and resultant decrease in turbine speed. Regardless of the cause, whenever the engine is operating substantially below the speed called for, pushrod 119 will come into engagement with the acceleration limit cam follower 115 and will unload the speed lever 121 and the acceleration valve 136 will open to indicate the under-speed condition.

Turning now to the effect which acceleration valve operation has upon the action of the lock-out valve assembly, it is apparent that if the acceleration valve is open then line 109 connects to drain and fluid pressure cannot build up in the end of cylinder 89 to cause movement of valve piston 87 towards the right. Under these conditions the fluid pressure supply to the cylinder bleeds off through groove 103, port 105, check valve 107, and the line 109 to drain. To assure that the flow resistance of this drain connection is not such that pressure build-up may occur in the lock-out valve cylinder notwithstanding the open condition of acceleration valve 139, the fixed orifice 79 through which the servo fluid supply connects into the lock-out valve cylinder limits the rate of pressure fluid flow to the cylinder to a valve sufficiently low that no pressure build up can occur except when the acceleration valve 136 is closed.

In the manner just explained, the lock-out valve assembly 71 operates to assure that the afterburner shut-off valve cannot be opened to initiate afterburner fuel flow whenever an engine off-speed condition exists. This assures that fuel flow to the engine afterburner cannot commence until such time as the engine has reached the speed level called for, which normally is maximum speed since afterburner fuel usually not called for until the throttle lever reaches a setting corresponding to maximum available "dry" engine thrust which of course calls for maximum speed.

It will be noted that the valve port 105 in the cylinder wall of lock-out valve assembly 71 is closed by the cooperating wall of the valve piston 87 as that piston moves towards the right to open the afterburner shut-off valve and initiate afterburner fuel flow. Therefore, whenever the lock-out valve piston 87 moves to the right to open the afterburner shut-off valve and initiate afterburner fuel flow, the valve port 105 is closed by the piston and once this occurs the valve piston 87 will be held in the position it then occupies, regardless of whether line 109 later is disconnected from drain by action of the acceleration valve 136. This is of advantage because initiation of afterburner operation frequently results in a momentary deceleration of the engine due to an increase of back pressure on the turbine caused by afterburner fuel combustion, and such engine deceleration may cause opening of the acceleration valve 136. If opening of this valve were now permitted to cut off afterburner fuel flow, this could give rise to an unstable condition under which the afterburner would cut itself on and off cyclically.

The control signal provided by acceleration valve 136 also assists in the control of engine nozzle area during off-speed conditions such as occur during engine acceleration. Before discussing the manner in which this control signal is introduced into the nozzle area control system, however, the general arrangement and construction of the nozzle area control will first be explained.

The engine nozzle actuators are directly controlled by a mechanical link 151 having pivotal connection to a crank element 153 affixed to a shaft 155 which is journaled for rotation in fixed bearing structure 157 as shown. Shaft 155 is rotated by a servo unit 159 including a power piston 161 linked to the shaft 155 by crank 163. This servo is of bleed type having a servo fluid supply through line 165 and including a fixed orifice 167 and variable orifice 169 with the area of the latter being controlled by a flapper element 171. The servo power piston 161 normally will follow movement of the flapper element 171, being compelled to do so by variation of the differential pressure across the piston. Such differential pressure variation is effected by variation of the relative open areas of the fixed orifice 167 and variable orifice 169, in the manner characteristic of bleed servos such as that shown.

Flapper element 171 is fixed to a shaft 173 which is journaled for rotation in a bearing 175 mounted in fixed housing structure. At its upper end, the flapper element 171 is provided with an adjustable cam follower 177 engaging one camming surface of a cam member 179 fixed to the throttle lever shaft 73. The cam follower is urged into engagement with cam 179 by a tension spring 181 linked to the flapper element so as to cause the cam follower to follow the contour of the cam unless it is prevented from doing so by one of the override inputs to the flapper element shaft 173, which overrides will be explained hereinafter.

In the absence of an override signal, the cam linkage between the throttle lever shaft 73 and flapper element 171 will position the servo power piston 161 and, through it, the nozzle actuator control rod 151, as a direct function of throttle lever position. The throttle cam 179 is contoured so as to provide optimum nozzle open area for engine operating conditions at each throttle lever setting.

Under certain conditions of operation of the engine, and particularly during operation of the afterburner, the maximum potential of the engine may be more fully realized if control of nozzle area is taken away from the throttle lever and the nozzle is instead placed under control of means responsive to turbine temperature. When operating in this mode, the nozzle area control positions the nozzle in a manner such as to hold turbine temperature constant at a value at or near the maximum permissible temperature level. This enables fuller realization of available thrust, and at the same time provides better correlation between operation of the nozzle area control and that of the afterburner fuel control than could be provided by the throttle lever alone.

To these ends, the shaft 173 carrying the nozzle servo flapper element 171 has affixed to it an abutment element 183 adapted to engage a pin 185 mounted to a lever 187. This lever is pivotally mounted to and has a lost motion connection as at 189 to a shaft 191 journaled for rotation in a bearing 193 mounted to fixed housing structure. Lost motion thus provided is normally taken up by a coil spring 195 having one of its ends fixed in shaft 191 and its other end engaging the lever 187, urging its rotation in clockwise direction to take up the lost motion in connection 189. The strength of this spring 195 is such that it normally holds the lever 187 and shaft 191 in the relative positions illustrated, so that the flapper shaft 173 is constrained to follow any clockwise rotation of shaft 191, with the cam follower 177 pulling away from cam 179 as necessary to permit such clockwise rotation of shaft 173 and the flapper element.

Shaft 191 has fixed to it a cam follower member 197 engaged by a cam 199 which is carried by the shaft 201 of an electrical servo motor driven by the temperature amplifier 53. As explained above in reference to FIGURE 1, the temperature amplifier 53 has as its input a temperature signal from thermocouple 51 mounted in the engine tailpipe just downstream of the turbine so as to be responsive to turbine exhaust gas temperature. With this arrangement, the servo motor 203 operates within limits imposed by stop elements 205 to position cam 199 as a direct function of turbine temperature. Should this temperature level exceed the design value, which normally is near the maximum safe temperature level which the engine can withstand, the resultant rotation of cam 199 will rotate lever 197 and the attached shaft 191 in clockwise direction. Shaft 191 will drive lever 187 through spring 195 to cause corresponding clockwise rotation of lever 183 and the shaft 173 carrying flapper element 171. The servo power piston 161 will follow the flapper element with resultant movement of lever 153 in the "nozzle open" direction indicated. As the nozzle opens, this reduces back pressure on the turbine with consequent reduction in turbine temperature.

Once the temperature limit mechanism just described has assumed control of nozzle area in the manner explained, it will continue to control opening and closing movement of the nozzle so as to hold turbine temperature at constant predetermined level. Of course, if turbine temperature falls to a value such that shaft 173 is permitted to rotate back to the point at which cam follower 177 again contacts the throttle cam 179, the throttle cam will again assume control and will control any further closing movement of the nozzle as a function of throttle lever position. In this way, control of engine nozzle position automatically may be taken over by whichever of the two inputs—namely, the throttle lever input through cam 179 and the temperature control input through servo motor 203—is calling for the more open nozzle position.

This is desirable because the consequence of a nozzle setting more open than necessary is a reduction of realized thrust, whereas the consequence of too small a nozzle opening is a possible overtemperature of the engine with resultant serious damage to it.

As hereinbefore mentioned, however, the engine is not likely to run into temperature problems except during afterburner operation. Temperature control of nozzle area is therefore not essential except during afterburning operation, and it accordingly may be desirable to lock the temperature control input out of the system during non-afterburning or "dry" engine operation, or at least limit its control action. This assures that if during "dry" operation there is a failure of the temperature limit system or any of its components such as the temperature amplifier, the nozzle cannot be driven to full open position by the temperature limit mechanism. In other words, full open position of the nozzle is not required during dry operation of the engine, and to protect against the loss of engine thrust which would result from a temperature limit system failure driving the nozzle full open, the temperature limit system may if desired be disabled or limited in range of action execept during afterburning operation.

To accomplish this, the valve piston 87 of afterburner lock-out valve assembly 71 is provided with a stem 207 which extends outside the valve housing 89 and is connected to one end of a lever 209 pivotally mounted as at 211 to fixed housing structure as shown. The free end of this lever 209 is disposed in position to engage lever member 187 in the temperature limit system so as to limit clockwise rotation of lever 187 whenever the lock-out valve piston 87 occupies the position shown, i.e., when it is in its non-afterburning or "dry" position. When afterburning operation is initiated by rotation of throttle lever 73, this causes the lock-out valve piston 87 to move to the right in the manner previously explained, and this movement rotates lever 209 in counterclockwise direction so as to remove its free end from engagement with lever 187. Thus, during afterburning operation, clockwise rotation of lever 187 is permitted and the temperature limit system may under these conditions assume control of nozzle area as explained above.

Desirably, the control of nozzle area may as hereinbefore mentioned be made subject to the control signal from the acceleration valve 136. To this end, the cylinder within which the nozzle servo piston 161 reciprocates is provided with a port 213 through the cylinder wall intermediate its ends. This port 213 is so disposed that it opens into the cylinder when the piston 161 moves to the right towards nozzle close position, but is closed off by the piston when moving towards the lefthand end of the cylinder. Port 123 communicates through a fixed orifice 215 with the line 109 which connects to the acceleration valve 136.

It will be recalled that the operation of acceleration valve 136 is such that line 109 connects to drain through valve 136 whenever an off-speed condition exists, i.e., whenever the engine is accelerating, and that whenever the engine reaches the called-for speed level then line 109 is closed to drain. It will also be recalled that the control inputs to the nozzle servo flapper element 171 are so arranged that this element always may move in nozzle opening direction, with cam follower 177 lifting from cam 179 and lever 183 separating from pin 185 if necessary to permit flapper movement in this direction.

Now if the nozzle servo piston 161 is at or near the righthand end of its travel for any reason, whether because of the throttle cam input or the temperature limit input, the generation of an off-speed signal by the acceleration valve 136 will operate to connect line 109 to drain. The fluid pressure equilibrium previously existing in nozzle servo 159 will now be disturbed, by virtue of the fact that the variable area orifice 169 now has in parallel with it a second flow path to drain through port 213 and line 109. Fluid pressure to the left of piston 161 accordingly will drop, and the piston will move towards the left to cause the nozzle to open. When the piston reaches the position illustrated, it will close off the port 213 and further movement of the nozzle servo piston will be halted unless such further movement is called for by one or another of the control inputs to the flapper element.

In this fashion the engine nozzle is made to move in opening direction, to a predetermined open position determined by the location of port 213 along the path of travel of servo piston 161, whenever the acceleration valve 136 senses an engine off-speed condition. Such automatic opening of the engine nozzle offers significant advantages during both afterburning and "dry" operating modes. During "dry" operation, the automatic opening of the nozzle whenever the control senses that the engine is underspeed and trying to accelerate, permits faster acceleration. This follows because opening the nozzle reduces back pressure on the turbine and thus allows the engine to accelerate more rapidly. Similarly, during afterburning operation there normally results some deceleration of the engine due to the rise in back pressure on the turbine caused by combustion of the afterburner fuel. Such engine deceleration causes the nozzle to open to minimize the back pressure increase and also minimize the time required to accelerate the engine back to the called for speed level.

Turning now to the manner in which afterburner fuel flow is metered, it was explained with reference to FIGURE 1 that fuel metering is accomplished by means 47 in response to a control signal from the afterburner fuel and nozzle area control. In FIGURE 2, the element which transmits this control signal to the fuel metering unit is a control rod 217 which is pivotally connected to the lower end of a lever member 219 carrying a cam follower element 221 adjacent its upper end. Cam follower 221 is urged toward engagment with a camming surface on the throttle lever cam 179 by the same spring 181 which loads the nozzle servo flapper element against the cam. Lever member 219 bears against a fixed pivot element 223 and operates to position the control rod 217 directly in accordance with throttle cam position, the throttle cam contour normally being cut so as to schedule increasing afterburner fuel with increasing throttle angle through the afterburner range.

Such throttle lever control is subject to two overrides. The first of these is under control of the turbine temperature limit mechanism and the nozzle servo flapper element positioned thereby. The afterburner fuel metering control rod 217 and flapper element 171 may interengage through an adjustable stop element 223 carried by the flapper element 171 in position to engage one end of a bellcrank member 225 the other end of which is pivotally connected to control rod 217 as shown. In operation of this override the stop member 223 comes into contact with bellcrank 225 to cause decrease in afterburner fuel supply whenever the temperature limit servo motor 203 has driven the nozzle servo flapper element 171 to full nozzle open position and engine overtemperature still continues. Under such conditions, the servo motor 203 will continue to drive the nozzle flapper element 171 and the attached stop member 223 into engagement with bellcrank 225 to reduce the afterburner fuel supply as necessary to bring turbine temperature back down to the called-for value. Thus, the system operates to provide sequential limiting of nozzle area and afterburner fuel supply, with nozzle area being the primary control parameter and afterburner fuel supply as a secondary control parameter to which resort is had in event nozzle area control proves inadequate to limit turbine temperature for any reason.

An added safeguard may if desired be provided in the form of a nozzle position signal to the afterburner fuel metering control. As illustrated, this signal is provided by a shaft 227 mechanically linked to the engine nozzle elements so as to directly indicate the position thereof by rotation of shaft 227. A cam 229 fixed to this shaft engages the lever member 219 and operates to lift throttle cam follower 221 from the throttle cam 179 whenever the engine nozzle is not sufficiently open that the engine can safely accommodate the afterburner fuel supply which would otherwise be called for by the throttle lever cam 179. This serves the purpose of preventing supply of sufficient afterburner fuel to initiate afterburner combustion if for any reason the nozzle happens to be closed at a time when the throttle lever is calling for afterburner fuel supply. This feature also prevents afterburner fuel flow from ever getting too far out of line with nozzle area, and additionally operates to reduce afterburner fuel flow if the nozzle control should happen to fail in the nozzle closing direction during afterburning operation. This serves to minimize the otherwise serious overtemperature which would occur if full afterburner fuel supply were continued. During normal operation, however, this cam 229 is so contoured as to only just contact the follower member 219 and, under these conditions, the throttle cam 179 exercises controls through its follower 221.

Thus the afterburner fuel and nozzle area control system of FIGURE 2 supplies to the metering valve assembly 47 (FIGURE 1) a control signal operative to regulate the supply of afterburner fuel to the engine, and at the same time operates to control the shut-off valve in the inlet of the afterburner fuel pump 43 which supplies fuel to the metering valve assembly. Since during "dry" operation of the engine, this afterburner fuel pump normally still is connected to be driven by the engine, it is desirable to unload the pump by venting from the pumping chamber all fluid entrapped therein at the moment of closing of the shut-off valve 45. To this end, the check valve 57 preferably is provided with a bleed orifice 231 which connects through the check valve housing and a line 233 to the pump bearing sump at 235 and thence through a passage 237 formed in the pump housing to a point upstream of the shut-off valve.

Through these passages, any fuel contained in the pumping chamber at time of shut-down of the afterburner system may be pumped back to a point upstream of the shut-off valve and the pumping chamber thus voided of fuel. This reduces the power required to drive the pump during "dry" operation of the engine. During such operation, however, it is desirable to lubricate the pump shaft bearings and as shown this may be accomplished by a line 239 connecting through line 101 and line 69 to the servo fluid supply which, being tapped from the discharge of the engine main fuel pump, always will provide a supply of pressure fluid for lubricating the pump shaft whenever the engine is operating.

The operation of the afterburner fuel and nozzle area control will now be explained, with reference first to the non-afterburning or "dry" mode of operation. When the throttle lever 31 is at a setting calling for operation in this mode, throttle shaft 73 and the pilot valve 75 controlled thereby operate to connect the line 81 to afterburner lock-out valve 71 to drain through the pilot valve. The lock-out valve piston 87 is therefore urged to the left by spring 91, to the position illustrated.

With the lock-out valve piston 87 in this position, the afterburner fuel shut-off valve 45 is closed by reason of the connection of its pressure fluid supply line 67 to drain through port 93 in the lock-out valve assembly 71. There accordingly is no flow of fuel to the afterburner fuel pump 43 and no supply of fuel to the afterburner.

The lock-out valve piston 87 in the position it now occupies holds the temperature limit disabling lever 209 in position such that its free end may engage lever 187 and, through its lost motion connection at 189, limit clockwise movement of the lever responsive to turbine temperature rise. This limitation on movement of lever 187 acts either to disable its control function completely or at least to limit the range through which it may drive the nozzle servo in nozzle opening direction. The temperature limit mechanism is thus limited in action during "dry" operation to assure against its driving the nozzle full open in event of failure. Nozzle area now is scheduled simply as a function of throttle lever position and of the contour of the throttle cam 179 against which the nozzle servo flapper element engages.

If the operator now advances the throttle lever to call for increase in engine speed, the resultant rotation of the throttle lever input 131 to the engine main fuel control 33 will cause counterclockwise rotation of the speed reset lever 125 with consequent translatory movement of the pivot point of speed lever 121 in leftward direction. Pushrod 119 will therefore move towards the left into engagement with the acceleration limit lever 115, halting further leftward movement of the pushrod 119 until engine speed increases to a level such that it can safely accommodate the fuel increase called for. Speed lever 121 will thus be unloaded from pushrod 119, and spring 141 thereupon will urge pivot element 135 towards the right, causing opening of the acceleration valve 136 to indicate an "off-speed" condition.

This will connect line 109 to drain through the acceleration valve 136. If the nozzle servo piston 161 now occupies a position such that the engine nozzle is open, i.e., the servo piston occupies a position in which it covers port 213, the opening of the acceleration valve 136 will have no effect upon operation of the servo. However, if the engine nozzle is in relatively closed position, i.e., the servo piston 161 is toward the righthand end of its travel, port 213 will now be open to drain through line 109 and acceleration valve 136. There accordingly will result a reduction in fluid pressure to the left of servo piston 161 and the piston will translate towards the left and move to a position such that it just covers the port 213. In this fashion, the nozzle servo piston and the nozzle itself both move automatically towards nozzle open position whenever an under-speed condition exists, thus facilitating acceleration of the engine to correct the under-speed.

Now if the operator advances throttle lever 31 into the after-burning range, the pilot valve 75 will be rotated by throttle shaft 73 to a position such that the pilot valve directly interconnects lines 77 and 81, to thus duct servo pressure fluid to the lock-out valve assembly 71. If such throttle lever advancement was from a point below the maximum speed level of the engine, an engine speed increase also will be called for by the throttle lever input to the main fuel control through shaft 131 and speed reset cam 129. The main fuel control accordingly will sense an underspeed condition and acceleration valve 136 will open, venting line 109 to drain. The pressure fluid supply to lock-out valve 71 through line 81 accordingly will be connected to drain through port 105, check valve 107 and line 109 to the acceleration valve and thence to drain. Under these conditions there can be no build-up of pressure to the left of the lock-out valve piston 87, and the piston accordingly will remain in the position shown until such time as engine speed has increased to the level called for, at which time the acceleration valve 136 will close and thus close off the connection of line 109 to drain.

When this occurs, the lock-out valve piston 87 will translate to the right, to connect the shut-off valve control line 67 to the servo fluid supply 69 through line 101 and port 97 in the lock-out valve cylinder 89. The resultant application of pressure to the upper side of shut-off valve piston 63 will cause that piston to move downwardly to open the shut-off valve. Fuel pump 55 thereupon will commence to supply fuel to the afterburner through line 59.

As the lock-out valve piston 87 moves to the right, it rotates lever 209 in counterclockwise direction to remove the free end of that lever from engagement with the temperature limit lever 187, allowing the temperature limit mechanism to assume control of engine nozzle area whenever turbine temperature reaches a level such as to require a more open setting of the engine nozzle than would be afforded by the throttle cam 179 and its input to the nozzle servo.

In event turbine temperature continues to increase or remains above the maximum safe level after the temperature limit mechanism and the nozzle servo controlled thereby have moved the engine nozzle to full open position, the continued rotation of nozzle servo flapper element 171 by the temperature limit mechanism will bring the flapper element into contact with the bellcrank 225 which connects to the afterburner fuel metering valve through rod 217. The temperature limit mechanism then acts through this connection to cut back on afterburner fuel supply as necessary to bring turbine temperature back down to safe level.

At the moment of initiation of fuel supply to the engine afterburner, the combustion of this fuel in the engine tailcone normally will result in an increase in gas pressure in the tailcone, and this increase of back pressure on the turbine may cause the engine to decelerate. Such engine deceleration constitutes an off speed condition which the main fuel control will sense and will indicate by opening the acceleration valve 136. When this occurs with the nozzle in relatively closed position, then the venting of the nozzle servo 159 through port 213, line 109 and acceleration valve 135 to drain, will cause the nozzle servo to translate towards the left to open the nozzle in precisely the same fashion as previously explained with reference to operation in the "dry" or non-afterburning regime. Such nozzle opening action is of advantage both for the reason that it enables faster acceleration of the engine due to reduction in back pressure on the turbine, and also in that it assists in limiting any overtemperature which might otherwise occur by reason of afterburner fuel combustion at relatively closed nozzle setting.

To further assume against such contingency, the nozzle position signal transmitted by rod 227 and cam 229 to the afterburner fuel supply control rod 217 may override the afterburner fuel setting called for by throttle cam 179 and prevent or limit the supply of afterburner fuel until such time as the nozzle position signal cam 229 indicates that the nozzle has reached a sufficiently open position that afterburner fuel can safely be supplied without risk of engine overtemperature.

With reference now to FIGURE 3, the afterburner fuel metering unit 47 is shown schematically. The fuel line 59 from the afterburner fuel pump connects through a metering valve assembly designated generally by reference numeral 231, a pressure regulating valve assembly 233 and a check valve assembly 235 to the line 49 connecting to the engine afterburner fuel manifold. The metering valve unit 231 meters total flow of fuel to the engine afterburner. This valve comprises a valve piston 237 free to rotate and to translate within a cylinder 239 to control the open area of a metering orifice defined by cooperating ports 241 in the valve piston and 243 in the valve cylinder, the latter port connecting into the pressure regulating valve 233 previously mentioned.

For effecting rotary movement of the metering valve piston 237, the valve piston is provided with a stem 247 pivotally connected as at 249 to the piston rod 251 of a bleed servo designated generally by reference numeral 253, which in turn is controlled by the afterburner fuel control rod 217 connecting to the afterburner fuel and nozzle area control system of FIGURE 2. This bleed servo 253 comprises a servo power piston 255 reciprocable within a cylinder 257 one end of which is connected through line 259 to afterburner fuel line 59 for supply of pressure fluid to the servo. A fixed orifice 261 and variable area orifice 263 the open area of the latter of which is determined by the afterburner fuel control rod 217, co-act in the manner characteristic of bleed servos to cause the servo piston 255 to follow motion of the afterburner fuel control rod 217 to thus rotate the metering valve piston 237 in direct accordance with position of the control rod 217.

Translatory movement of the metering valve 237 is effected by a similarly operative bleed servo in which the metering valve piston 237 itself constitutes the servo piston. The metering valve piston has formed therein a fixed orifice 265 in series flow relation with the variable area orifice 267 the open area of which is determined by position of a flapper element 269 pivotally mounted as at 271 to fixed housing structure.

Position of the servo flapper element 269 is controlled by a bellows assembly comprising a sensing bellows 273 and compensating bellows 275 arranged in opposed relationship. Sensing bellows 273 connects through a line 277 to a point in the engine main air flow passage preferably just downstream of the compressor so as to provide a measure of compressor discharge pressure and thus of total engine air flow during afterburner operation. Bellows 275 is evacuated and provides compensation for pressure variations within the chamber in which the bellows assembly is mounted. To counter the fluid pressure derived forces on the bellows assembly, flapper element 269 has affixed thereto one end of a tension spring 279. The other end of this spring connects to one end of a lever 281 pivotally connected as at 283 to a fixed housing structure and pivotally connected also as at 285 to the metering valve stem 247.

In operation of the parts just described, a change in compressor discharge pressure transmitted through line 277 to the bellows assembly will result in corresponding change in the longitudinal position of the metering valve piston within its cylinder 239. In the case of a compressor discharge pressure increase, for example, the bellows 273 into which this pressure is connected will tend to expand responsive to the pressure increase; this will rotate flapper element 269 in clockwise direction about its pivot point 271 with consequent opening movement of pilot valve 267. The relatively greater open area of this pilot valve as compared to the open area of fixed orifice 265 will cause a drop in pressure in the space below metering valve piston 237, with consequent downward movement of the valve piston. The corresponding downward movement of the valve stem 247 will rotate lever 281 in counterclockwise direction about its pivot 283, thus increasing the tension of spring 279. The resultant increase in spring force will oppose the fluid pressure derived force of sensing bellows 273, in a manner to compress the bellows back to its original length.

Since the bellows 273 and 275 thus are always returned to their original positions and occupy these same positions irrespective of variations in the air pressures sensed thereby, the spring constants of the two bellows and any changes in the spring constants thereof due to temperature variations and other causes, do not significantly affect accuracy of the compressor discharge pressure measurement provided by the bellows assembly. Preferably a small spring 287 is provided adjustably mounted as shown for trimming the control point about which the bellows assembly operates.

Before considering further the details of operation of metering valve 231, certain basic principles of afterburner operation will briefly be reiterated. As hereinbefore explained, the ratio of afterburner fuel flow to afterburner air flow is critical to satisfactory operation of the afterburner since if this fuel air ratio is too low combustion cannot be sustained in the afterburner and flameout will occur; if the fuel air ratio is too high then engine tailpipe and nozzle temperatures will become excessive and there also may be waste of fuel due to incomplete combustion. It therefore is necessary that afterburner fuel air ratios be held within a range of values within which afterburner fuel combustion may satisfactorily be maintained at the same time providing variation of afterburner fuel flow within this range as necessary to obtain desired engine output thrust variation.

In the fuel metering unit of applicant's invention, metering of afterburner fuel flow to accomplish these ends is obtained through the combined rotary and translatory movement of the metering valve piston 237. The afterburner control rod 217 controls rotary movement of the metering valve piston 237 to obtain direct correspondence between angular position of the metering valve piston and longitudinal position of the afterburner fuel control rod 217, to thus schedule a desired fuel-air ratio. The air pressure sensitive bellows assembly 273—275 controls translatory movement of the metering valve piston 237 to introduce a measure of engine air flow. In effect the air flow valve thus introduced is multiplied by the metering valve unit times the scheduled valve of fuel-air ratio.

The product thus obtained, i.e., scheduled fuel-air ratio times measured air flow, directly yields the fuel flow rate to be held by the afterburner metering valve. In this way the afterburner fuel-air ratio control signal supplied to the fuel metering unit by the afterburner fuel control rod 217 is effectively integrated with an air flow signal to provide afterburner fuel flow at a rate such as to obtain the fuel-air ratio called for by the afterburner control rod 217, and to hold this fuel-air ratio irrespective of variations in engine air flow.

The mating ports 241 and 243 in the metering valve piston 237 and cylinder 239, respectively, if shaped with square outline will provide simple multiplication of the fuel-air ratio signal input by the air flow signal input, to thus yield directly a fuel flow rate such as to maintain precisely the fuel-air ratio called for. However, in some applications it may be preferred to make these ports 241 and 243 of other than square outline. They may, for example, be of the shape shown in FIGURE 4 wherein the port 243 has one wall 289 slanted with respect to the other. The particular non-square configuration illustrated serves the purpose of limiting the maxmium flow of fuel to the afterburner as a function of compressor discharge pressure. Thus as maximum afterburner fuel flow is called for by vertical alignment of the two ports 241 and 243, and as port 241 moves to the right relative to port 243 (as viewed in FIGURE 4) with increasing compressor discharge pressure, then as the slanted wall 289 of port 243 comes into alignment with port 241 afterburner fuel flow will no longer increase linearly with compressor discharge pressure but will reach a maximum varying as some predetermined function of compressor discharge pressure determined by the configuration of port wall 289.

A maximum limit on fuel flow to the afterburner is thus afforded by proper selection of size and outline contour of the fuel metering ports 241 and 243, fuel flow through these ports being directly proportional to the open area thereof by reason of the action of the pressure regulating valve 233 which holds constant pressure drop across the metering orifice in the manner hereinafter explained. It is desirable also to provide a minimum flow limit on afterburner fuel flow, since obviously there is nothing to be gained by supply of fuel to the afterburner unless the supply is at least adequate to maintain combustion. Also, since the amount of fuel supply to the afterburner required to support combustion varies widely depending upon the rate of air flow through the engine tailpipe, it is desirable that this minimum fuel flow limit be made variable as a function of engine air flow or engine compressor discharge air pressure which, as previously noted, provides a measure of engine air flow.

In accordance with the invention, such minimum flow limit is provided by a minimum flow lever 291 pivotally connected as at 293 to the afterburner fuel control rod 217 and pivotally connected as at 295 to fixed housing structure. At its upper end, the minimum flow lever 291 carries an adjustable stop member 207 adapted to engage a cam follower member positioned by a minimum fuel cam 301. This cam is pivotally mounted to the compressor discharge pressure sensor assembly feedback lever 281 as at 303 and may be adjusted relative thereto by threaded means 305 as shown.

It will be recalled that the feedback lever 281 is pivotally connected as at 285 to the metering valve stem 247, so that angular position of feedback lever 281 accurately follows the movement of the metering valve piston. Viewed another way, the air pressure sensing assembly constitutes a force balance servo system the force input to which is a pressure derived force directly proportional to engine compressor discharge air pressure. This force is balanced directly against the loading force of spring 279, and since at equilibrium of the system the lower end of this spring remains stationary (i.e., the flapper element 269 to which the spring is attached returns always to the same position, at equilibrium), it follows that the lever 281 to which the upper end of spring 279 is connected must move to a position such that the applied spring force just balances the compressor discharge pressure derived force against which it acts. Assuming the spring action to be linear, it follows that movement of the feedback lever 281 will be in direct proportion to the air pressure sensed, and the feedback lever thus will provide an accurate measure of air pressure and thus of air flow in the engine afterburner.

The minimum flow cam 301 accordingly positions cam follower element 299 in direct accordance with engine air flow. Now if the afterburner fuel control rod 217 moves to the right in afterburner fuel flow decreasing direction, it ultimately will engage the stop element 299 and further movement of the control rod will be halted. The minimum fuel cam 301 then will assume control of afterburner fuel air ratio, and will schedule a minimum fuel air ratio varying with contour of the cam and with its position as determined by operation of the air pressure sensor assembly and its feedback lever 281 to which the cam is attached. In this fashion the afterburner minimum fuel flow is made a function of compressor discharge pressure to thus assure that fuel supply to the afterburner is adequate to support combustion therein, but does not greatly exceed this required minimum.

It was previously mentioned that the pressure regulating valve 233 operates to hold constant pressure drop across the fuel metering orifice defined by ports 241 and 243, such constant pressure drop being desired in order to assure that fuel flow through the metering orifice will bear direct proportionality to the open area thereof. Briefly, this valve comprises a valve piston 327 reciprocable within a cylinder to control communication between the metering valve port 243 and an outlet line 329 connecting to the engine afterburner. The righthand face of valve piston 327 is subjected directly to a metering valve downstream pressure; the lefthand face of the valve piston is subjected to metering valve upstream pressure through a passage 331. This latter face of the valve piston has projecting therefrom a valve stem 333 extending to the exterior of the valve housing and there engaging a loading spring 335 the free end of which is mounted adjustably to fixed housing structure as at 337.

The valve piston area relationships are such that at the design value of metering valve pressure drop, the metering valve downstream pressure acting on the righthand face of the valve piston produces a force thereon which exceeds that produced by the metering valve upstream pressure acting upon the lefthand face of the valve piston, which has smaller effective area due to the presence of stem 333. The net force on the valve piston accordingly is towards the left in FIGURE 3, and is countered by spring 335. Any unbalance of the spring and pressure derived forces on the valve piston will cause its movement in a direction and to an extent such as to restore and hold the desired predetermined pressure drop across the metering valve 231.

The necessary limitation on minimum fuel flow to the engine afterburner may be reduced to substantially lower level if, instead of attempting to support afterburner fuel combustion over the entire cross-sectional area of the engine afterburning zone, afterburner fuel flow at very low rates of flow is confined to a pilot burner element. In other words, at relatively low values of afterburner fuel flow the fuel is distributed uniformly over the entire cross-sectional area of the engine tailpipe would not form a fuel area mixture adequately rich to support proper combustion, but if confined to a pilot burner or to one segment of a multiple segment burner, then fuel air mixtures adequately rich for proper combustion may be maintained locally adjacent the pilot burner even at very low afterburner fuel flow rates.

The afterburner fuel metering unit of the invention is adapted to use with such pilot and main burner combinations, and for metering fuel flow to the pilot burner includes a second or pilot burner metering valve designated generally by reference numeral 307. This valve controls flow of fuel from a line 309 connecting to the outlet of the main metering valve 231, to a line 311 which connects through a check valve 313 of conventional construction, to a line 315 connecting to the afterburner pilot burner (not shown). Pilot burner metering valve 307 includes a valve piston 317 which is coupled by pin 319 to the valve piston 237 of main metering valve 231. The pilot burner valve piston 317 and the cylinder 321 within which it reciprocates are provided with metering ports 323 and 325, respectively.

The metering ports preferably are shaped as shown in FIGURE 5, wherein the metering port 325 is shown of such width relative to that of port 323 that transverse movement of the one port relative to the other has no effect upon the open area defined by the two metering ports together. Since transverse relative movement of the two ports as shown in FIGURE 5 (or rotary movement thereof as shown in FIGURE 3), is responsive to the afterburner fuel control input, it follows that operation of the pilot burner metering valve is substantially independent of the afterburner control input and is dependent solely upon vertical movement of the one metering port relative to the other in response to changes in compressor discharge pressure. In this fashion the control of fuel flow to the afterburner pilot burner is made primarily dependent upon the rate of air supply to the afterburner and assures adequate fuel flow to the pilot burner to maintain satisfactory combustion there under all operating conditions.

From the pressure regulating valve 233 fuel flow to the engine main afterburner passes through a check valve 235 including a valve piston 339 and cooperating seat 341. Check valve piston 339 is positioned by an actuator piston 343 slidable within a cylinder 345 and urged in valve closing direction by a compression spring 347. To drive the valve actuator in valve opening direction against the action of spring 347, a line 349 connects the cylinder space to the left of actuator piston 343 to the afterburner fuel supply line 59, thus connecting the valve actuator directly to afterburner fuel supply pump pressure whenever supplied. Thus, whenever the afterburner fuel supply line 59 is pressurized by the afterburner fuel pump, fuel under pressure is transmitted through line 349 into the check valve actuator cylinder 345 to drive the actuator piston 343 and valve piston 339 in valve opening direction.

In most engine control installation the various components of the control system desirably are mounted some substantial distance from the engine burners if mounted in close proximity thereto the control would be subjected to the high temperatures normally to be encountered adjacent the burners. To enable such remote mounting of the control system, it is necessary that the lines which duct fuel from the control to the burners be relatively long and, accordingly, they will have substantial fluid capacity which must be filled with fuel before flow through the burner nozzles actually can begin.

To expedite the process of filling these fuel flow lines to the engine afterburner, the check valve 235 preferably incorporates additional structure for bypassing a quantity of fuel around the main and pilot valve metering valves directly to the fuel flow lines to the afterburner. To accomplish this, a passage 351 including a fixed orifice 353 therein and a passage 355 including a fixed orifice 357 therein are provided in the check valve. These passages connect the space 359 within actuator cylinder 345 to the afterburner fuel supply lines 49 and 311, respectively, with communication between the space 359 and passages 351 and 355 being controlled by the check valve piston 339.

In operation of the parts just described, the supply of afterburner fuel through fuel line 59 and through line 349 into the space 359 within actuator cylinder 345 will pressurize the space 359. Responsive to this pressure, fuel will flow through passage 351 and through the now opening check valve 235 into line 49 to fill that line quickly with fuel. At the same time, fuel will flow through passage 355 into the pilot burner supply line 311 to fill that line in like manner, to thus more quickly establish fuel pressure in the burner flow lines and to prevent the delay which otherwise would be incurred in pressurizing the afterburner fuel spray nozzles. As the check valve 339 is moved towards the right by its actuator piston 343, the valve piston ultimately will reach and slide over the ports through which passages 351 and 355 open into space 359. The passages then are blocked and all further flow to the afterburners now must pass through the main metering valve 231 or pilot burner metering valve 307.

To control the duration of such "fill" supply to the burner flow lines, the check valve actuator cylinder 345 is provided with a restricted orifice 361 through which fluid displaced by movement of the valve actuator piston 343 must pass. By proper selection of size of this orifice 361, the rate of travel of the check valve piston assembly may be controlled so as to permit just sufficient fuel flow through passages 251 and 355 to provide adequate "fill" of the burner flow lines to which these passages connect.

Desirably, the flow lines 49 and 315 to the engine afterburner are purged of fuel upon a shutdown of the afterburner, since any fuel permitted to remain in these lines for any substantial period of time is likely to "coke" or otherwise cause clogging of the fuel lines particularly in view of the high temperatures to which these lines normally are subjected. To afford such purging action, a purge valve assembly 363 is provided having a connection as at 365 to engine compressor discharge air. The purge valve comprises a valve piston 367 slidable within a cylinder to control communication between the compressor air line 365 and two branch lines 369 and 371 connecting to the main afterburner fuel line 49 and pilot burner fuel line 315, respectively.

The purge valve piston 367 is normally urged to valve closed position by pressure of the afterburner fuel supply, a connection to which is made through line 373. This pressure holds the valve closed whenever the afterburner is in operation. Upon shut-down of the afterburner, however, pressure fluid supply through line 373 is cut off and the compressor air supply through line 365 then will force the valve piston 367 to the right, to provide communication with branch lines 369 and 371. The high pressure air from the engine compressor then will pass through branch lines 369 and 371 to the burner supply lines 49 and 315, purging all fuel contained in these lines through the associated burner nozzles. The air then may be permitted to continue to bleed through the burner nozzles, since the amount of air involved is not such as to significantly affect performance of the engine.

While only one embodiment of the invention has been described and illustrated by way of example in the foregoing, many modifications will occur to those skilled in the art and it therefore should be understood that the appended claims are intended to cover all such modifica-

What is claimed as new and desired to be secured by Letters Patent of the United States is:

1. For use with a throttle lever controlled turbine engine including an afterburner having main and pilot burners and fuel supply lines thereto, afterburner fuel metering means comprising a first metering valve for controlling total fuel flow to said main and pilot burner supply lines, a second metering valve in said pilot burner supply line for controlling pilot burner fuel flow, each of said metering valves including valve piston and cylinder members free for relative movement in both rotary and translatory modes and having cooperating port means therein defining a metering orifice, means responsive to throttle lever position to effect relative movement of said first metering valve piston and cylinder members in a first of said two modes, means providing a measure of afterburner air flow operative to effect relative movement of said first metering valve piston and cylinder members in the second of said two modes in accordance with air flow, means interconnecting said first and second metering valves to effect conjoint movement of the second metering valve with the first metering valve in at least said second mode of relative movement of the valve members and a pressure regulating valve in said main burner supply line operative in response to pressure drop across said first metering valve to control main burner fuel flow so as to hold said pressure drop substantially constant.

2. Afterburner fuel metering means as defined in claim 1, wherein the first and second metering valves are interconnected for conjoint movement in both said modes and the cooperating port means in said second metering valve define a metering orifice of open area independent of valve member movement in said first mode responsive to throttle lever position.

3. Afterburner fuel metering means as defined in claim 1, including limit means operative under control of said means providing a measure of afterburner air flow to limit relative movement of said first metering valve piston and cylinder members in said first mode in valve closing direction to thus impose a minimum flow limit variable with air flow.

4. Afterburner fuel metering means as defined in claim 3 wherein said means providing a measure of afterburner air flow comprise servo means including a feedback member movable to effect servo rebalance, and said minimum flow limit means comprises a limit cam carried by said feedback member and cam follower means adapted to engage said limit cam and override the throttle lever control of said first metering valve to thus limit relative movement of said valve piston and cylinder members in valve closing direction.

5. For use with a throttle lever controlled turbine engine including an afterburner having main and pilot burners and fuel supply lines thereto, afterburner fuel metering means comprising a first metering valve for controlling total fuel flow to both said main and pilot burner supply lines, said first metering valve including at least two control inputs independently adjustable to control total flow through the valve and to said main and pilot burner supply lines, a second metering valve interposed in said pilot burner supply line and including at least one control input operative to control fuel flow to said pilot burner, means responsive to throttle lever position providing a first control input to said first metering valve, means providing a measure of afterburner air flow and connected to provide a second control input to said first metering valve, and means interconnecting said first and second metering valves to effect conjoint control thereof by at least the one of said control inputs responsive to afterburner air flow measure, and a pressure regulating valve in said main burner supply line operative in response to pressure drop across said first metering valve to control main burner fuel flow so as to hold said pressure drop substantially constant.

References Cited in the file of this patent

UNITED STATES PATENTS

| | | |
|---|---|---|
| 2,820,340 | Dolza | Jan. 21, 1958 |
| 2,856,754 | Torell | Oct. 21, 1958 |
| 2,879,643 | Stroh | Mar. 31, 1959 |
| 2,916,876 | Colley | Dec. 15, 1959 |
| 2,921,433 | Torell | Jan. 19, 1960 |
| 2,953,899 | Sorensen | Sept. 27, 1960 |
| 2,988,875 | Farkas | June 20, 1961 |
| 2,988,883 | Corbett | June 20, 1961 |